H. LANE.
LIQUID MEASURING APPARATUS.
APPLICATION FILED DEC. 13, 1909.
987,892.
Patented Mar. 28, 1911.
3 SHEETS—SHEET 1.
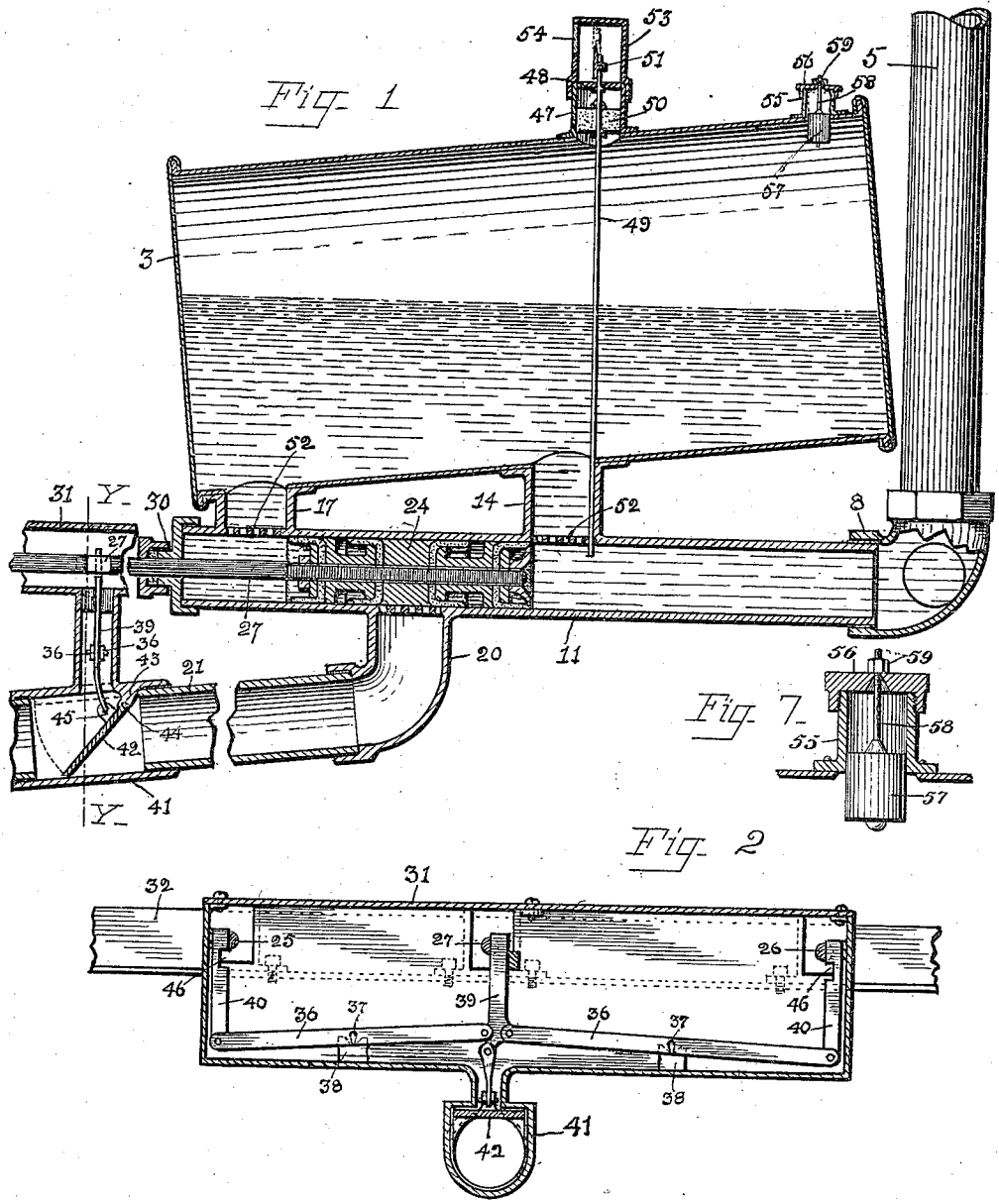

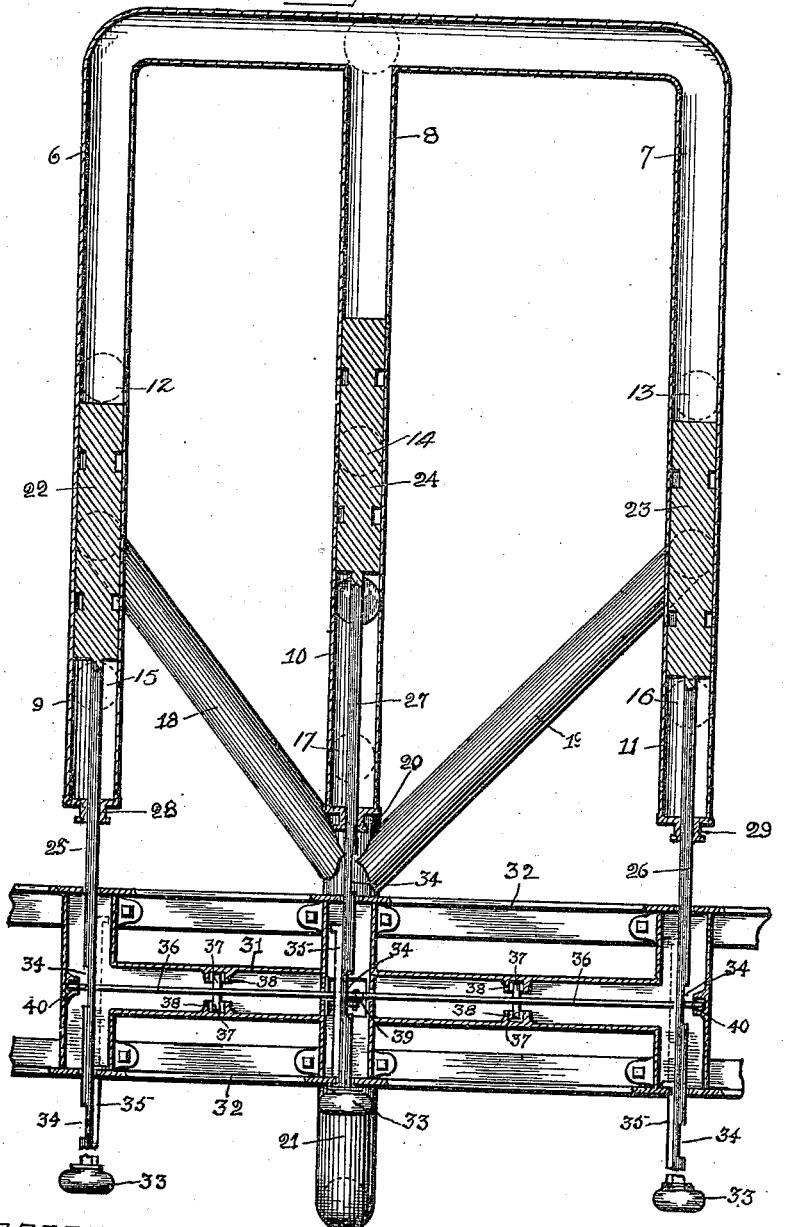

H. LANE.
LIQUID MEASURING APPARATUS.
APPLICATION FILED DEC. 13, 1909.
987,892.
Patented Mar. 28, 1911.
3 SHEETS—SHEET 3.
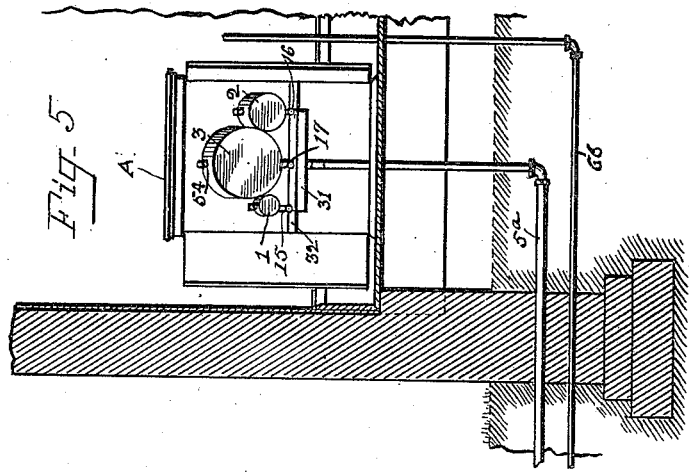
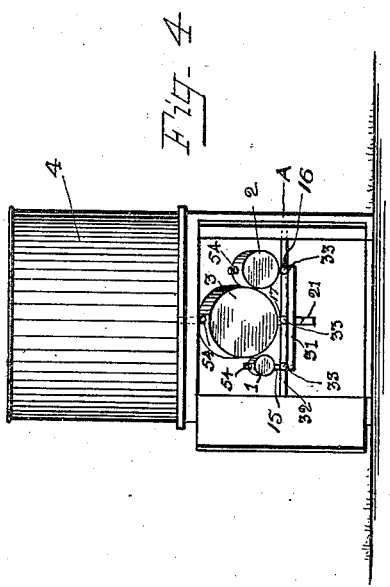
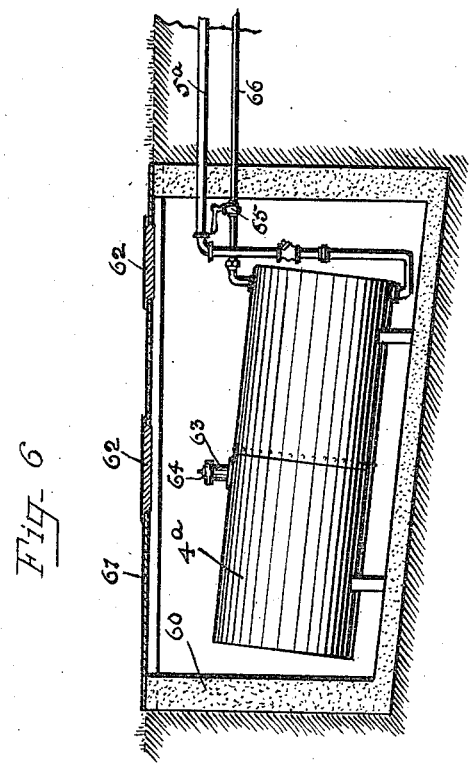

UNITED STATES PATENT OFFICE.

HARVEY LANE, OF TOLEDO, OHIO, ASSIGNOR TO THE H. LANE MANUFACTURING COMPANY, OF TOLEDO, OHIO.

LIQUID-MEASURING APPARATUS.

987,892.   Specification of Letters Patent.   Patented Mar. 28, 1911.

Application filed December 13, 1909. Serial No. 532,825.

*To all whom it may concern:*

Be it known that I, HARVEY LANE, a citizen of the United States, residing at Toledo, in the county of Lucas and State of Ohio, have invented a new and useful Improvement in Liquid-Measuring Apparatus, of which the following is a specification.

My invention relates to a liquid measuring apparatus and has for its object to provide a closed supply tank with a convenient, accurate, and positively acting apparatus of the kind, whereby liquid may be readily drawn from the tank, but only in full, true and accurate quantities according to standard legal units of liquid measure.

A further object is to provide an apparatus of the kind, having the limitations described, and comprising a series of standard liquid measures of different capacities, each provided with means whereby any one of the series may be readily filled with liquid from the supply tank, but can not be emptied until completely filled, and the connection between the measure and the supply tank is completely closed, and in which said connection cannot be opened while the measure is being emptied.

A further object is to provide an apparatus of the kind and having the limitations last described, in which all the measures may be automatically filling at the same time, and when filled any one of the series of measures may be emptied, but while being emptied the other measures of the series are automatically locked against being emptied and are automatically unlocked when the measure that is being emptied is fully emptied and not before.

I accomplish these objects by the construction and combination of parts, hereinafter described and illustrated in the drawings, in which—

Figure 1 is a vertical, diametric section longitudinal of a cylindrical measuring vessel and the filling and discharging apparatus. Fig. 2 is a vertical section through its automatic locking mechanism on line *y—y* of Fig. 1. Fig. 3 is a longitudinal section through the filling, discharging and locking apparatus in the common horizontal plane of the axes of the cylindrical controlling valves of the series of measuring vessels. Fig. 4 is a front elevation of my apparatus attached to a supply tank, adapted to supply liquid to the measuring vessels by gravity flow. Fig. 5 is a similar view of my apparatus adapted to be supplied with liquid from an underground reservoir by elastic fluid pressure, Fig. 6 is a side elevation of an underground reservoir for the apparatus shown in Fig. 5 in broken through connection therewith and Fig. 7 is an enlarged vertical longitudinal diametric section of the air vent float valve, shown in Fig. 1.

In the drawings 1, 2 and 3 are cylindrical measuring vessels having capacities of exact standard units of liquid measure, preferably of relative capacities of one quart, one gallon and five gallons respectively, which are suitably supported with their axes slightly inclined from a horizontal with their lower sides in a common plane, and are connected to a main supply tank 4 adapted to supply liquid thereto by gravity by a pipe 5, having branches 6, 7 and 8 respectively connected by the cylindrical valve casings 9, 10 and 11, and their respective inlet connections 12, 13 and 14 with the under sides of the measuring vessels 1, 2 and 3.

The valve casings 9, 10 and 11 are also respectively provided with the outlet connections 15, 16 and 17, which connect with the measuring vessels at their lowest points, and centrally between and oppositely to the inlet and outlet connections, the valve casings are provided with the discharge pipes 18, 19 and 20, the pipes 18 and 19 forming a junction with the pipe 20 which has an extension 21 forming a common discharge nozzle for the measures.

The valve casings are respectively provided with the valve pistons 22, 23 and 24, which are each of a length to close both the openings from the valve casings to the inlet connections and to the discharge pipes, so that the discharge pipe of each valve casing is fully closed before the piston begins to open the inlet connection and vice versa, the inlet connection is fully closed before the piston begins to open the discharge pipe.

The valve pistons are respectively provided with the operating stems 25, 26 and 27, which respectively extend through the stuffing boxes 28, 29 and 30 on the outer ends of the valve casings. The inlet connections 12, 13 and 14 of the valve casings with the measuring vessels are of greater length than the outlet connections 15, 16 and 17 from the vessels to the valve casings, so that the valve casings extend horizontally in a common plane.

The stems 25, 26 and 27 extend forward through a lock casing 31, and the vertical webs of parallel angle bar supports 32 for the lock casing, which extend horizontally from side wall to side wall of the cabinet A to which the ends of the bars 32 are suitably secured. The stems are provided with knobs or handles 33 on their outer ends for operating the pistons, and each is provided with a pair of locking side incuts 34, and with a stop 35 which engages the outer bar 32 and limits the distance of outward movement of the stem, the knob 33 forming a stop to limit the inward movement of the stem.

Within the lock casing is provided a pair of levers 36 preferably fulcrumed by knife bearings 37 on V bearings 38 of the casing. The levers 36 at their inner ends are suitably pivoted to a central locking bar 39, and at their outer ends to the locking bars 40, and the levers are normally balanced in horizontal alinement when the central locking bar is detached from the operating valve hereinafter described.

The discharge nozzle 21 near the junction of the discharge pipes 18, 19 and 20 has coupled therein the casing 41 of a disk gate valve 42. The gate valve 42 is hinged to a lug 43 in the upper portion of the casing 41 by a pin 44 and extends outward at an angle therefrom to the bottom wall of the bore of the casing, and in such position forms a closure for the bore that is adapted to be swung outward and upward on its hinge pin 44 by the weight and pressure of liquid above and behind the gate and flowing through the nozzle from either of the discharge pipes 18, 19 and 20.

The upper side of the gate 42 near the hinge pin 44 is provided with a lug 45 to which is linked the lower end of the lock bar 39, whereby when the gate is raised the lock bar 39 is raised and the lock bars 40 are lowered. The top portions of the lock bars 39 and 40 are adapted to extend respectively into the side incuts of the stems of the piston valves, the lock bar 39 into the incuts of the stem 27 as the bar is raised, and the locking bars 40 into the incuts respectively of the stems 25 and 26 as they are lowered. The locking bars 40 are provided with the incuts 46, whereby when the bars are raised the stems 25 and 26 may pass freely by the lock bars.

All of the lock bars are normally held out of the incuts of the stems by the weight of the gate 42, which is sufficient in addition to the weight of the locking bar 39 to overbalance the locking bars 40 and raise their notches 46 in line with the stems 25 and 26 respectively, and lower the top end of the bar 39 below the stem 27, thereby leaving all of the stems 25, 26 and 27 normally unlocked, and free to move their respective valve pistons in either direction so long as the gate 42 remains in its normally lowered position, as shown in Fig. 1.

The valve pistons 22, 23 and 24 respectively when pulled outwardly by their respective stems to engagement of the stops 35 with the outer angle bar support 32 fully open the inlet connections of their respective valve casings to the measuring vessel, and when pushed inwardly thereby to engagement of the knobs 33 with the same support 32, fully uncover the openings of the valve casings to their respective discharge pipes; and it will be seen that when said valve pistons are pulled outwardly the openings to the discharge pipes will be fully closed before the pistons begin to open the inlet connections and when pushed inwardly that the pistons fully close the inlet connections before they begin to open the discharge pipes.

The pair of incuts 34 in each piston stem is so located in the stem relative to inward and outward movement of the piston that one incut of the pair is in position to receive a locking bar when the piston is in any position fully closing the discharge pipe and the other incut is in position to receive the locking bar whenever the piston begins to open the discharge pipe, whereby whenever the locking bar is in the outer incut the stem is locked against opening the discharge pipe, and whenever the locking bar is in the inner incut, the stem is locked against movement of the piston to close the discharge pipe, the incuts of the stem being of a length to permit the locking bars to enter one or the other of them in any position of the piston, fully closing, or partly or fully opening the discharge pipe.

The parts being thus constructed, connected and operatively combined, it will be seen, (1) that all of the pistons being pushed inward to the limit of their movement in that direction, all of the inlet connections 12, 13 and 14 will be fully closed, the discharge pipes 18, 19 and 20 will be open, the measuring vessels 1, 2 and 3 will be empty, and the gate valve 42 will be in its normally lowered position holding the locking bars 39 and 40 in positions unlocking the stems 25, 26 and 27. (2), being in this position, any one or more or all of the pistons being pulled out far enough to partly or fully open their respective inlet connections, the measures will be filled up from the main supply tank according as their connections are opened. (3), when filled any one of the measures may be emptied by pushing the stem of its piston valve inward until the inlet connection is fully closed, and the discharge pipe is either partly or fully opened. When the liquid therefrom has reached the gate 42, the gate will be raised and the locking bar 39 will be raised and the locking bar 40 will be lowered into incuts 34 of each of the stems, being the outer incut of the stem that is pushed in, and the inner incuts of the stems that remain pulled out, and it is obvious that the stem that is pushed in cannot be pulled out, or the stems that are out cannot be pushed in until the liquid has ceased to run through the nozzle 21 and the gate 42 has returned to its normal position.

By the construction and operation of the locking mechanism, when a measuring vessel is once opened for emptying it cannot be closed again until it has entirely emptied, thereby securing delivery of the exact contents of the measure.

By locking the other measures against being discharged, while one is being discharged, is made practical the discharge of each measure through a common spout, and the locking of each measure against being closed before it is fully emptied by a common locking gate. It is apparent that the measures after being all filled may be emptied in pairs, or all at one time by pushing the stems inward at the same time, but whether emptied singly or together, each of the measures opened for discharge is locked against being closed before all that are opened are fully emptied.

When the valve pistons or any one or more of them are pulled outward in position to fill the measures, to insure against the pistons being operated to close the measures before they are completely filled, I provide each measure with an automatic lock and indicator, which, when the piston valve of a measure is pulled outward to partly or fully open the inlet connection of the measure, automatically locks the piston against being pushed back to fully close the inlet connection before the measure is entirely filled, and that automatically unlocks the piston and indicates that the measure is filled when it is completely filled and not before. Said locking and indicator attachment comprises a cylindrical valve casing 47, open and flanged at its lower end for attachment to the periphery of the measure around an orifice that is diametrically and vertically above the inlet connection of the measure, and closed at the top and provided on the inner side of the top with a conical valve seat 48 around a central opening, through which extends a lock rod 49 of small diameter, diametrically of the measure, and through the inlet connection of the measure with the bore of the valve casing into the bore. Within the casing 47, a float valve 50 is fixedly mounted on the rod 49 of sufficient buoyancy to float the valve and the rod 49, which latter is preferably a tube having a small portion of its lower end filled solid. To the top end of the rod 49 is secured an indicator tablet 51 as shown (in edge view) in Fig. 1, adapted to indicate the capacity of the measure, the tablet forming a stop which limits the distance that the lower end of the rod extends into the valve casing. The valve 50 is provided with a conical extension at its upper end adapted to fit into the seat 48 of the casing 47. The valve casings are preferably provided with integral perforated diaphragms 52 opposite their inlet and outlet connections with the measures, and the lower end of each rod 49 extends through a perforation of the inlet connection, which perforation serves as a guide for the lower end.

Preferably the casing 47 is provided with a sight cap 53 which is adapted to be threaded onto the upper end portion of the casing and inclose the indicator tablet 51, the cap being provided with a sight glass 54 through which the indicator tablet may be seen when in raised position.

The measures being thus equipped, whenever a piston is in position opening the inlet connection of its casing, either partly or fully, and the measure be not completely filled so as to raise the float valve 50 to lift the lower end of the rod 49 above the piston chamber, the rod 49 will prevent the full closure of the inlet connection by the piston until the measure is completely filled and the indicator tablet is lifted into view through the sight glass 54, thereby insuring that the measure cannot be emptied before it is entirely filled. By combining the automatic locking and controlling mechanisms described with the measuring vessels as set forth, I have provided a convenient and reliable apparatus whereby liquid can be readily drawn from a main supply tank and delivered in accurate measured quantities, according to the full capacity of the measure or measures used, no less and no more, at any one drawing, and thereby prevent inaccurate measurement by inadvertence, inattention or intention. The measures 1, 2 and 3 are also provided at their highest points each with an air vent, comprising a valve casing 55, having a top closure 56 provided with a central orifice, and with a conical valve seat around the opening on the inner side, and a float valve 57 having a stem 58 loosely extending through the top 56, and provided with an adjustable nut 59, which holds the float valve pendent within the casing and the measure. The valve stem at the top end of the float is conically enlarged to closely fit the valve seat and close the vent opening when the measure is entirely filled. The vent permits the free flowing of liquid into and from the measure.

In Figs. 5 and 6 is illustrated my apparatus adapted to deliver liquid from an underground supply tank $4^a$ within a concrete vault 60, having a cover 61 provided with manholes, and with covers 62 for the manholes, one above a filling tube 63 having a closure cap 64 and the other above a shut off valve 65 in a supply pipe 66 connecting the tank 4ᵃ with a pump or other means (not shown), of supplying compressed air or gas to the tank. The tank 4ᵃ is provided with a supply pipe 5ᵃ which extends from the tank, at a point adapted to drain the tank, to the branches 6, 7 and 8 connected to the valve casings and forming a common connection thereto. The liquid in the tank 4ᵃ being put under sufficient pressure, the operation of filling the measures 1, 2 and 3 is controlled, as hereinbefore described. Preferably, however, the valves are left normally closing the inlet connections, when gasolene or other inflammable liquids are stored in the tank.

What I claim to be new is—

1. In a liquid measuring apparatus, the combination of a closed measuring vessel having an inlet pipe and an outlet pipe, a supply tank having a supply pipe, a discharge pipe, a valve casing having one end portion forming a connection between the supply and inlet pipes, and the other end portion forming a connection between the outlet and discharge pipes, a valve piston reciprocable in the valve casing and adapted when in the center of its stroke to close both the inlet and outlet connections and when moved from such central position toward the outlet connection to the end of its stroke to fully open the inlet without opening the outlet, and when moved from such central position to the end of its stroke toward the inlet connection to fully open the outlet connection without opening the inlet connection, means to reciprocate the piston in the casing and means to limit the maximum stroke of the piston in one direction to the full opening of the inlet without opening the outlet, and in the opposite direction to the full opening of the outlet, without opening the inlet.

2. In a liquid measuring apparatus, the combination of a closed measuring vessel having an inlet pipe and an outlet pipe, a supply tank having a supply pipe, a discharge pipe, a valve casing having one end portion forming a connection between the supply and the inlet pipes, and the other end portion forming a connection between the outlet and the discharge pipes, a valve piston reciprocable in the valve casing and adapted when in the center of its stroke to close both the inlet and outlet connections, and when moved from such central position toward the outlet connection to the end of its stroke, to fully open the inlet without opening the outlet, and when moved from such central position to the end of its stroke toward the inlet connection, to fully open the outlet connection without opening the inlet connection, means to reciprocate the piston in the casing, means to limit the maximum stroke of the piston in one direction to the full opening of the inlet without opening the outlet, and in the opposite direction to the full opening of the outlet without opening the inlet, and means to automatically lock the valve piston against closing the outlet connection before the vessel is completely emptied.

3. In a liquid measuring apparatus, the combination of a closed measuring vessel having an inlet pipe and an outlet pipe, a supply tank having a supply pipe, a discharge pipe, a valve casing having one end portion forming a connection between the supply and inlet pipes, and the other end portion forming a connection between the outlet and discharge pipes, a valve piston reciprocable in the valve casing and adapted when in the center of its stroke to close both the inlet and outlet connections and when moved from such central position toward the outlet connection to the end of its stroke to fully open the inlet without opening the outlet, and when moved from such central position to the end of its stroke toward the inlet connection, to fully open the outlet connection without opening the inlet connection, means to reciprocate the piston in the casing, means to limit the maximum stroke of the piston in one direction to the full opening of the inlet without opening the outlet, and in the opposite direction to the full opening of the outlet, without opening the inlet, and means to automatically lock the piston against closing the inlet and opening the outlet connection before the vessel is completely filled.

4. In a liquid measuring apparatus, the combination of a closed measuring vessel having an inlet pipe and an outlet pipe, a supply tank having a supply pipe, a discharge pipe, a valve casing having one end portion forming a connection between the supply and inlet pipes, and the other end portion forming a connection between the outlet and discharge pipes, a valve piston reciprocable in the valve casing and adapted when in the center of its stroke to close both the inlet and outlet connections and when moved from such central position toward the outlet connection to the end of its stroke to fully open the inlet without opening the outlet, and when moved from such central position to the end of its stroke toward the inlet connection to fully open the outlet connection without opening the inlet connection, means to reciprocate the piston in the casing, means to limit the maximum stroke of the piston in one direction to the full opening of the inlet without opening the outlet, and in the opposite direction to the full opening of the outlet, without opening the inlet, and means to automatically lock the piston against closing the outlet and opening the inlet connection before the vessel is completely emptied.

5. In a liquid measuring apparatus, the combination with a supply tank of a closed measuring vessel having an inlet and an outlet independent of the inlet, a supply pipe connecting the supply tank with the inlet connection, a valve controlling the inlet and the outlet of the measuring vessel reciprocable means adapted when moved in one direction to operate the valve to first close the outlet and then open the inlet connection, and when moved in the opposite direction to operate the valve to first fully close the inlet and then open the outlet, and means to automatically lock the controlling means against closing the inlet after it is opened, until the measure is completely filled, and means to automatically unlock the piston when the vessel is full.

6. In a liquid measuring apparatus, the combination with a supply tank of a closed measuring vessel having an inlet and an outlet, a supply pipe connecting the supply tank with the inlet, a valve controlling the inlet and the outlet of the measuring vessel reciprocable means adapted when operated in one direction to move the valve to first close the outlet and then open the inlet connection, and when operated in the opposite direction to first fully close the inlet and then open the outlet, and means to automatically lock the reciprocable means against operating the valve to the outlet after opening it, until the vessel is completely emptied.

7. In a liquid measuring apparatus, the combination with a supply tank of a closed measuring vessel having an inlet and an outlet, a supply pipe connecting the supply tank with the inlet, a reciprocable piston valve controlling the inlet and outlet of the measuring vessel, and adapted when in the center of its stroke to close both the inlet and the outlet, and when moved from said central position toward the outlet to open the inlet and keep the outlet closed, and when moved from said central position toward the inlet to open the outlet and keep the inlet closed, means to reciprocate the valve, means to automatically lock the valve against fully closing the inlet after it is opened until the vessel is completely filled and means to automatically unlock the valve simultaneous with the vessel becoming completely filled.

8. In a liquid measuring apparatus, the combination with a supply tank of a closed measuring vessel having an inlet and an outlet, a supply pipe connecting the supply tank with the inlet, a valve controlling the inlet and the outlet of the measuring vessel, reciprocable means adapted when operated in one direction, to move the valve to first close the outlet and then open the inlet, and when operated in the opposite direction to first fully close the inlet and then open the outlet, and means to automatically lock the reciprocable means against operating the valve to close the outlet, until the measure is completely emptied, and then, to automatically unlock the reciprocable means.

9. In a liquid measuring apparatus, the combination with a supply tank, of a closed measuring vessel having an inlet and an outlet, a supply pipe connecting the supply tank with the inlet, reciprocable means controlling the inlet and the outlet of the measuring vessel adapted to be operated in one direction to first close the outlet and then open the inlet, and to be operated in the opposite direction to first fully close the inlet and then open the outlet, means to automatically lock the reciprocable means against closing the inlet after it has been opened until the vessel is completely filled, and means to unlock the reciprocable means and signal the fact of the vessel being completely filled.

10. In a liquid measuring apparatus, the combination of a closed measuring vessel having an inlet pipe and an outlet pipe, a supply tank having a supply pipe, a discharge pipe, a valve casing having one end portion forming a connection between the supply and inlet pipes, and the other end portion forming a connection between the outlet and discharge pipes, a valve piston reciprocable in the casing, and adapted to close the outlet connection and keep it closed while the inlet is open to any degree, and to close the inlet connection and keep it closed while the outlet connection is open to any degree, a stem adapted to reciprocate the piston, and stops for the stem adapted to limit the maximum stroke of the piston in one direction to the full opening of the inlet without opening the outlet connection, and in the opposite direction to the full opening of the outlet without opening the inlet connection.

11. In a liquid measuring apparatus, the combination of a closed measuring vessel having an inlet pipe and an outlet pipe, a supply tank having a supply pipe, a discharge pipe, a valve casing having one end portion forming a connection between the supply and inlet pipes, and the other end portion forming a connection between the outlet and discharge pipes, a valve piston reciprocable in the casing, and adapted to close the outlet connection and keep it closed while the inlet is open to any degree, and to close the inlet connection and to keep it closed while the outlet connection is open to any degree, a stem adapted to reciprocate the piston, and means to automatically lock the stem against moving the piston to close the outlet connection before the vessel is completely emptied, comprising a gate in the discharge pipe, adapted to be lifted by liquid flowing through the pipe, and a locking bar movable by the gate to and from locking engagement with the valve stem, as the gate is lifted and locked by the liquid.

12. In a liquid measuring apparatus, the combination of a closed measuring vessel having an inlet pipe and an outlet pipe, a supply tank having a supply pipe, a discharge pipe, a valve casing having one end portion forming a connection between the supply and inlet pipes, and the other end portion forming a connection between the outlet and discharge pipes, a valve piston reciprocable in the casing, and adapted to close the outlet connection and keep it closed while the inlet is open to any degree, and to close the inlet connection and to keep it closed while the outlet connection is open to any degree, a stem adapted to reciprocate the piston, and means to automatically lock the stem against moving the piston to open the outlet connection before, and unlock it after, the vessel is completely filled, comprising a casing extending from the vessel diametrically opposite to the inlet pipe, a float having limited movement upward and downward in the casing, a locking rod pendent from the float and extending through the inlet pipe into the valve casing and adapted to be lifted out of the valve casing by the raising of the float.

13. In a liquid measuring apparatus, the combination with a supply tank of a series of closed measuring vessels of different capacities, each having an inlet connection and a discharge pipe, a main supply tank connected to the supply tank and having branches, one connected to the inlet connection of each measure, means for controlling the inlet connection and the discharge pipe of each measuring vessel, adapted to be operated in one direction to first close the discharge pipe and then open the inlet connection, and in the opposite direction to first close the inlet connection and then open the discharge pipe, a common spout for the discharge pipes of the measures, a gate in the spout normally lowered by gravity and adapted to be raised by liquid flowing through the spout, and locking mechanism adapted to be actuated by the gate to lock the controlling means of each measure against closing any discharge pipe that is open, and against opening any discharge pipe that is closed, while liquid is flowing through the spout, and that is adapted to unlock the controlling mechanism.

14. In a liquid measuring apparatus, the combination with a series of measuring vessels each having a filling inlet and a discharging outlet, and a valve casing connected to the inlet and outlet, said valve casing having a reciprocable piston adapted when moved in one direction to first close the outlet and then open the inlet, and when moved in the opposite direction to first close the inlet and then open the outlet, a supply pipe connected to each filling inlet and adapted to be connected with a liquid supply, a common spout for the discharging outlets, a gate in the spout normally lowered, and adapted to be raised by liquid flowing through the spout, a lock casing above the gate, a pair of horizontally alined locking levers in the lock casing, a stem for each valve extending through the lock casing above the levers, and reciprocable back and forward through the lock casing to operate the valves as set forth, locking bars, one for each stem movable by the levers into locking engagement with the stems respectively, and a connection between the gate and the levers adapting the levers to be operated by the gate to lock and unlock the stems, substantially as set forth.

15. In a liquid measuring apparatus, the combination of a closed measuring vessel, having an inlet pipe and an outlet pipe independent of the inlet pipe, a supply tank having a supply pipe, a discharge pipe, a valve casing having one end portion forming a connection between the supply and the inlet pipes, and the other end portion forming a connection between the outlet and discharge pipes, a valve piston reciprocable in the valve casing, said piston being of a length to close both the inlet and outlet connection at the same time, and movable to open either, after but not before the other is fully closed, means to reciprocate the valve and means to limit the stroke of the piston.

In witness whereof I have hereunto signed my name in the presence of two subscribing witnesses, this 29th day of November, 1909.

HARVEY LANE.

In presence of—
N. J. BILLINGSLER,
M. S. SMITH.

---

Copies of this patent may be obtained for five cents each, by addressing the "Commissioner of Patents, Washington, D. C."